(12) United States Patent
Urushihara et al.

(10) Patent No.: US 8,730,390 B2
(45) Date of Patent: May 20, 2014

(54) PICTURE PROCESSING APPARATUS, PICTURE PROCESSING METHOD, PROGRAM, AND PICTURE DISPLAY APPARATUS

(75) Inventors: Minoru Urushihara, Tokyo (JP); Hiroki Hamasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 92 days.

(21) Appl. No.: 13/363,658

(22) Filed: Feb. 1, 2012

(65) Prior Publication Data
US 2012/0206646 A1   Aug. 16, 2012

(30) Foreign Application Priority Data
Feb. 10, 2011   (JP) ................. P2011-026793

(51) Int. Cl.
*H04N 5/50* (2006.01)
(52) U.S. Cl.
USPC ................................................. 348/441
(58) Field of Classification Search
USPC ............. 348/441, 459, 449, 699, 700, 701; 382/300
See application file for complete search history.

(56) References Cited

U.S. PATENT DOCUMENTS

| | | | | |
|---|---|---|---|---|
| 3,882,304 A | * | 5/1975 | Walters ......................... | 700/163 |
| 5,583,794 A | * | 12/1996 | Shimizu et al. ............... | 382/243 |
| 2005/0207669 A1 | * | 9/2005 | Kameyama ................... | 382/274 |
| 2007/0146541 A1 | * | 6/2007 | Hirayama et al. ............ | 348/459 |
| 2009/0208137 A1 | * | 8/2009 | Urushihara et al. .......... | 382/300 |
| 2013/0135307 A1 | * | 5/2013 | Kawasaki et al. ............ | 345/424 |

FOREIGN PATENT DOCUMENTS

JP   2001-042831 A   2/2001

* cited by examiner

*Primary Examiner* — Paulos M Natnael
(74) *Attorney, Agent, or Firm* — Sony Corporation

(57) ABSTRACT

Disclosed herein are a picture processing apparatus and a picture display apparatus. A picture processing apparatus includes: an interpolated picture data generation portion generating interpolated picture data at given points in time in the course of time-series picture data based on the time-series picture data; and a control portion controlling the interpolated picture data generation portion by using multi-screen information of the time-series picture data. A picture display apparatus includes: the interpolated picture data generation portion generating interpolated picture data at given points in time in the course of the time-series picture data based on the time-series picture data; a picture display portion displaying pictures derived from the time-series picture data including the interpolated picture data generated by the interpolated picture data generation portion; and the control portion controlling the interpolated picture data generation portion by using the multi-screen information of the time-series picture data.

12 Claims, 9 Drawing Sheets

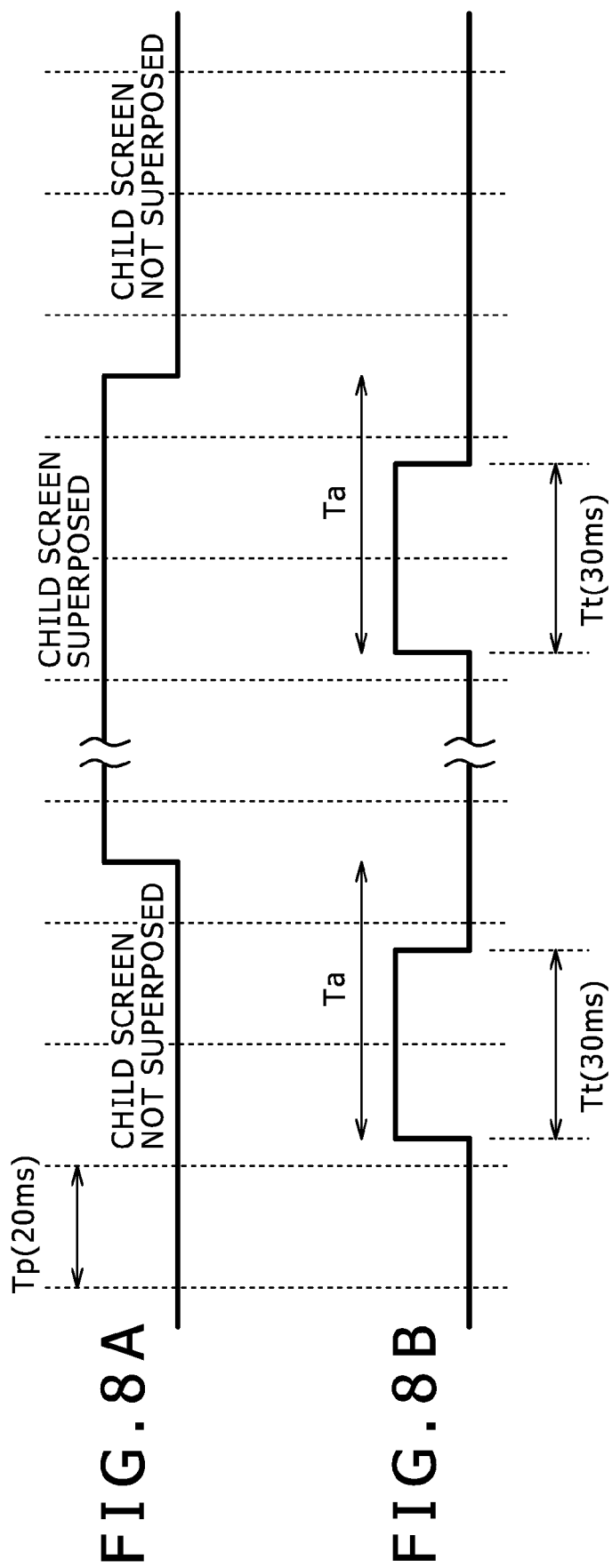

PICTURE PROCESSING APPARATUS, PICTURE PROCESSING METHOD, PROGRAM, AND PICTURE DISPLAY APPARATUS

CROSS-REFERENCE TO RELATED APPLICATION

The present application claims priority from Japanese Patent Application No. JP 2011-026793 filed in the Japanese Patent Office on Feb. 10, 2011, the entire content of which is incorporated herein by reference.

BACKGROUND

The present disclosure relates to a picture processing apparatus, a picture processing method, a program and a picture display apparatus. More particularly, the disclosure relates to a picture processing apparatus, a picture processing method, a program and a picture display apparatus for performing a high frame rate process on input time-series picture data for picture quality enhancement.

A frame interpolation process applied to a high frame rate process, a film motion compensation (Film MC) process and the like is an indispensable technique for picture quality enhancement of displayed pictures. For example, Japanese Patent Laid-Open No. 2001-042831 discloses how the frame interpolation process is carried out to improve the response speed of liquid crystal so as to enhance the picture quality of displayed pictures.

SUMMARY

FIGS. 9A and 9B show examples of multi-screen display mode in which a plurality of screens are displayed within the same screen. FIG. 9A shows so-called picture-in-picture (PIP) mode in which a parent screen displayed over the entire display surface of a picture display portion has a child screen superposed thereon. FIG. 9B shows so-called picture-and-picture (PAP) mode in which a parent screen and child screens are displayed side by side on the display surface of the picture display portion.

In the multi-screen display mode mentioned first above where a screen is superposed on another screen when displayed, there generally exists no correlation between the parent and the child screens in motion or the like. Still, some ICs (integrated circuits) having the capability of motion detection for frame interpolation purposes may handle the parent and the child screens altogether as a single picture.

There are cases in which the motion vector correlation of the entire screen is used in generating interpolated pictures. In such cases, uncorrelated motions between the parent and the child screens may affect the interpolation of both screens. For example, if the parent screen shows a still picture while the child screen shows quick movements, the parent screen showing the still picture may develop motions therein due to the movements in the child screen. In another example, interpolated pictures near the boundary between the parent and the child screens may be disrupted by the uncorrelated motions therebetween.

For the interpolation of a movie or the like being broadcast, it is possible to generate interpolated pictures of higher quality by detecting picture correlation regarding the regularity of frames being switched through the use of a motion detection technique or the like. However, if a video is being displayed on the child screen while a broadcast movie is being shown on the parent screen, the motions in the child screen may prevent the parent screen from being detected as showing the movie. As a result, it may not be possible to enhance the picture quality of the parent screen.

The present disclosure has been made in view of the above circumstances and enables the advantageous generation of interpolated picture data during the frame interpolation process in multi-screen display mode.

According to an embodiment of the present disclosure, there is provided a picture processing apparatus including: an interpolated picture data generation portion configured so as to, based on time-series picture data, generate interpolated picture data at given points in time in the course of the time-series picture data; and a control portion configured so as to control the interpolated picture data generation portion by using multi-screen information of the time-series picture data.

A picture processing method according to a further embodiment of the present disclosure includes: based on the time-series picture data, generating interpolated picture data at given points in time in the course of the time-series picture data; and controlling the generation of the interpolated picture data by using on multi-screen information of the time-series picture data.

A program according to a further embodiment of the present disclosure causes a computer to function as an apparatus including: an interpolated picture data generation portion configured so as to, based on the time-series picture data, generate interpolated picture data at given points in time in the course of the time-series picture data; and a control portion configured so as to control the interpolated picture data generation portion by using the multi-screen information of the time-series picture data.

A picture display apparatus according to a further embodiment of the present disclosure includes: the interpolated picture data generation portion configured so as to, based on the time-series picture data, generate interpolated picture data at given points in time in the course of the time-series picture data; a picture display portion configured so as to display pictures derived from the time-series picture data including the interpolated picture data generated by the interpolated picture data generation portion; and the control portion configured so as to control the interpolated picture data generation portion by using the multi-screen information of the time-series picture data. Controlling the interpolated picture data generation portion in this manner helps enhance the picture quality of the parent screen in multi-screen display mode.

According to a further embodiment of the present disclosure, for example, the interpolated picture data generation portion may include: a speed detection portion configured so as to detect speed information (motion vector) per frame based on the time-series picture data; and an interpolation processing portion configured so as to generate the interpolated picture data by using the speed information detected by the speed detection portion based on the time-series picture data. The control portion may control the speed detection portion substantially not to detect the speed in a child screen area.

In the above-outlined structure, the speed detection portion may detect the speed information (motion vector) per frame based on the time-series picture data. The interpolation processing portion may then generate interpolated picture data by using the speed information detected by the speed detection portion based on the time-series picture data. In this case, the control portion may control the speed detection portion substantially not to detect the speed in the child screen area.

When the speed detection portion is controlled in this manner, the interpolation processing portion can generate interpolated picture data for the parent screen without being affected by picture movements in the child screen area. Thus if there are quick movements on the child screen whereas the parent screen shows a still picture, for example, the parent screen displaying the still picture is protected against the appearance of motions triggered by the movements on the child screen. This also helps enhance the picture quality of display on the parent screen.

According to a further embodiment of the present disclosure, for example, the control portion may control the interpolated picture data generation portion not to generate the interpolated picture data for the child screen area. This structure prevents more reliably display disruptions in the child screen attributable to the halt of speed detection in the child screen area.

According to a further embodiment of the present disclosure, for example, the interpolated picture data generation portion may include a film picture determination portion configured so as to, based on the time-series picture data, detect the regularity of the time-series picture data in order to determine, using the information thus detected, whether the time-series picture data is film picture data generated from original film pictures. Based on the time-series picture data, the interpolation processing portion may generate the interpolated picture data using the result of the determination performed by the film picture determination portion along with the speed information detected by the speed detection portion. The control portion may control the speed detection portion substantially not to detect the speed in the child screen area while controlling the film picture determination portion not to reference the detected information regarding the regularity of the child screen area upon performing the determination.

In the above structure, the film picture determination portion may determine whether the time-series picture data is film picture data generated from original film pictures. And based on the time-series picture data, the interpolation processing portion may generate the interpolated picture data using the result of the determination performed by the film picture determination portion along with the speed information detected by the speed detection portion. When the time-series picture data is film picture data, the interpolation processing portion may generate the interpolated picture data corresponding to the film picture data. In this case, the control portion may control the speed detection portion substantially not to detect the speed in the child screen area while controlling the film picture determination portion not to reference the detected information regarding the regularity of the child screen area upon performing the determination.

When controlled in this manner, the film picture determination portion can properly determine whether the time-series picture data (parent screen) is film picture data without being affected by picture movements in the child screen area. Thus if the time-series picture data (parent screen) turns out to be film picture data, the interpolation processing portion can reliably generate the interpolated picture data corresponding to the film picture data. This also helps enhance the picture quality of the parent screen.

The picture processing apparatus according to a further embodiment of the present disclosure may further include a display on/off instruction reception portion configured so as to receive a child screen display on/off instruction. The display on/off instruction reception portion may transmit information representing the received child screen display on/off instruction to the control portion through port control. In this structure, the display on/off instruction reception portion can quickly send the information representative of the child screen display on/off instruction to the control portion.

The picture processing apparatus according to a further embodiment of the present disclosure may further include: a picture data input portion configured so as to input the time-series picture data from an external device; and a multi-screen information acquisition portion configured so as to acquire the multi-screen information of the time-series picture data input to the picture data input portion. For example, the multi-screen information acquisition portion may acquire the multi-screen information from the external device through communication with the external device. As another example, the multi-screen information acquisition portion may acquire the multi-screen information based on the input from a user. When the multi-screen information is acquired in such manners, it is possible to enhance the picture quality of the parent screen where the time-series picture data coming from the external device involves multi-screen display mode.

According to a further embodiment of the present disclosure, for example, if the multi-screen information acquisition portion does not acquire the multi-screen information of the time-series picture data input to the picture data input portion from the external device, then the control portion may control the interpolated picture data generation portion not to generate the interpolated picture data. With this structure, it is not evident whether the time-series picture data from the external device involves multi-screen display mode. When generation of the interpolated picture data is controlled to be suppressed, it is possible to avoid inconveniences such as letting the movements in the child screen affect the parent screen while the interpolated picture data is being generated.

According to the above embodiments of the present disclosure, it is possible suitably to generate interpolated picture data during the frame interpolation process in multi-screen display mode.

BRIEF DESCRIPTION OF THE DRAWINGS

Further objects and advantages of the present disclosure will become apparent upon a reading of the following description and appended drawings in which:

FIGS. 8A and 8B are schematic views showing a typical method of port communication by which a child screen display on/off information is transmitted through port control.

DETAILED DESCRIPTION OF THE PREFERRED EMBODIMENTS

Some preferred embodiments of the present disclosure (hereinafter called as "embodiment") will now be described below. The description will be given in the following order:
1. Embodiment; and
2. Modification changes.

1. Embodiment

[Typical Structure of the TV Set]

Figure 1:
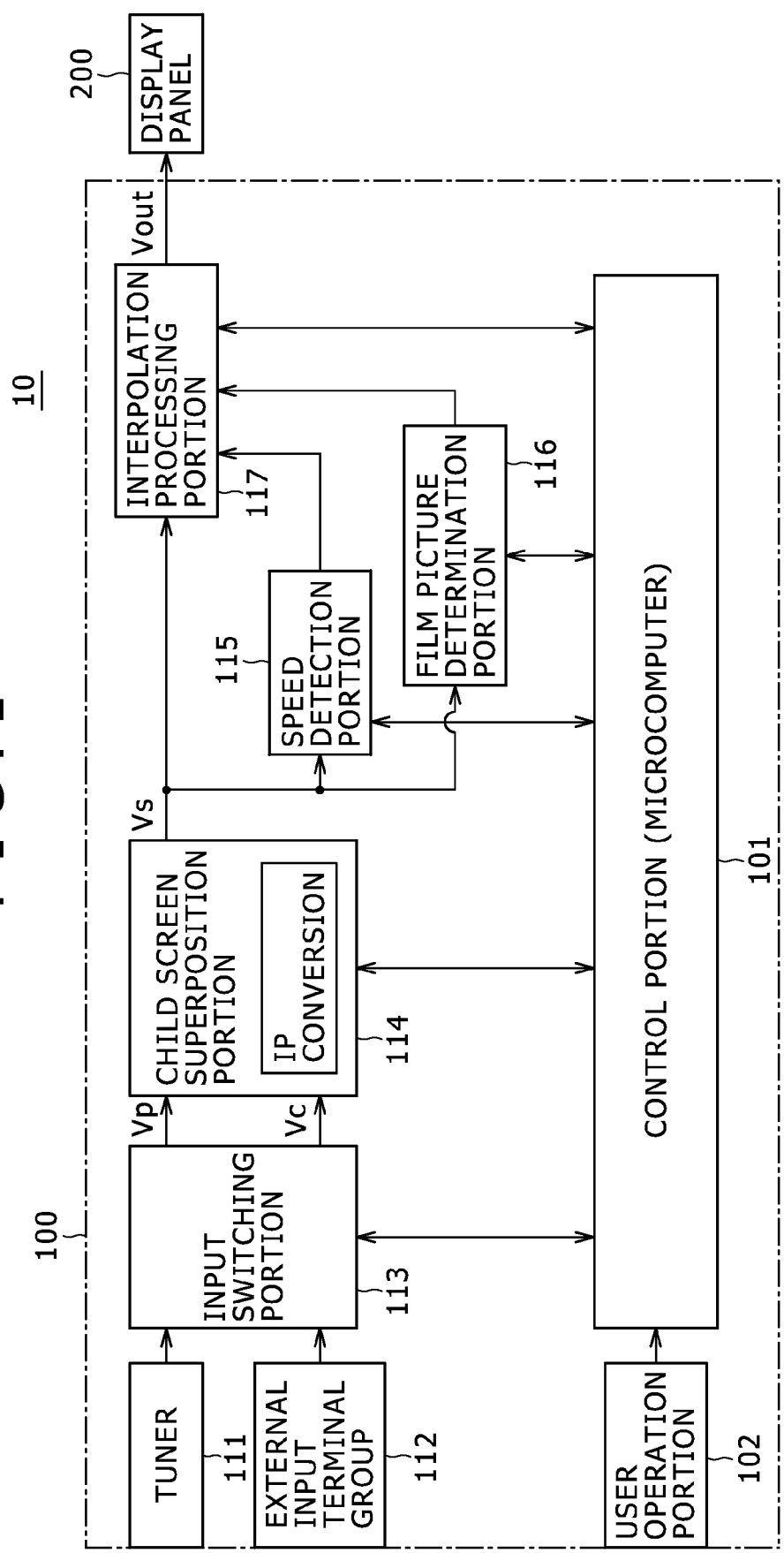
FIG. 1 is a block diagram showing a typical structure of a TV set as one embodiment of the present disclosure.

FIG. 1 shows a typical structure of a TV (television) set 10 as one embodiment of the present disclosure. The TV set 10 has a picture processing block 100 and a display panel 200. The display panel 200 may be a liquid crystal display panel, for example.

The picture processing block 100 has a control portion (microcomputer) 101 and a user operation portion 102. Also, the picture processing block 100 includes a tuner 111, an external input terminal group 112, an input switching portion 113, a child screen superposition portion 114, a speed detection portion 115, a film picture determination portion 116, and an interpolation processing portion 117. In this structure, the speed detection portion 115, the film picture determination portion 116 and the interpolation processing portion 117 make up a frame rate conversion portion.

The control portion 101 is composed of a microcomputer. The control portion 101 controls the operations of the components constituting the picture processing block 100. The user operation portion 102 makes up a user interface and is connected to the control portion 101. The user operation portion 102 is constituted by keys, buttons, dials, which are disposed on an enclosure of the TV set 10 but not shown in the drawing, a remote controller, or the like.

The tuner 111 receives satellite broadcasts (BS), terrestrial digital broadcasts, etc. A broadcast signal captured by an antenna, not shown, is input to the tuner 111. From the broadcast signal, the tuner 111 acquires picture data (time-series picture data) of a selected TV program based on the user's tuning operations. The external input terminal group 112 includes a plurality of terminals for inputting picture data (time-series picture data) from an external device. The external device, for example, may be a Blu-ray Disc (BD) recorder, a Digital Versatile Disc (DVD) player, a set-top box, a personal computer or the like.

From the picture data acquired by the tuner 111 or from the picture data input to the external input terminal group 112, the input switching portion 113 selectively extracts parent-screen picture data Vp and child-screen picture data Vc based on the user's operations. As needed, the input switching portion 113 may also perform a decoding process, a scaling process or the like. In this setup, the input switching portion 113 extracts as many sets of child-screen picture data Vc as the number of child screens to be displayed. The control portion 101 gives input switching instructions to the input switching portion 113 based on parent-screen and child-screen selection instructions given by the user through the user operation portion 102.

Figure 9A:
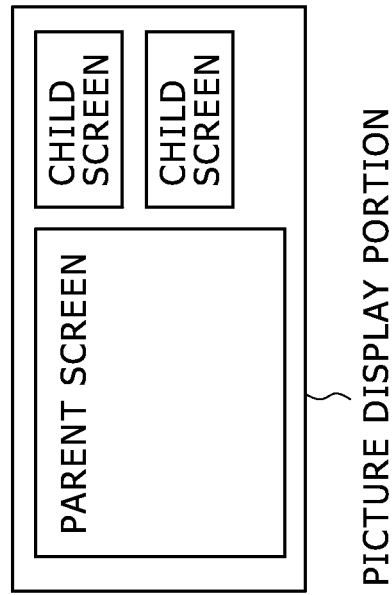
FIGS. 9A and 9B are schematic views showing examples of multi-screen display mode (picture-in-picture display and picture-and-picture display) in which a plurality of screens are displayed within the same screen.
Figure 9B:
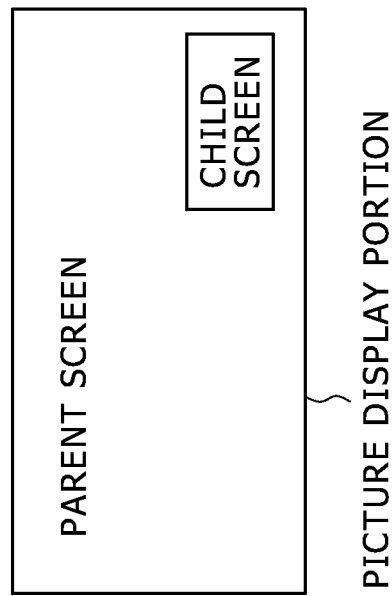

The child screen superposition portion 114 performs a child screen superposition process under control of the control portion 101. As needed, the child screen superposition portion 114 may perform an IP conversion process on the picture data Vp and Vc for conversion from interlaced to progressive. In performing child screen superposition, the child screen superposition portion 114 superposes the child-screen picture data Vc onto the parent-screen picture data Vp to generate picture data that provides a picture-in-picture screen (see FIG. 9A) or a picture-and-picture screen (FIG. 9B). The control portion 101 sends a child-screen display on/off command to the child screen superposition portion 114 based on the user's child-screen display on/off instruction entered through the user operation portion 102 or on the child-screen display on/off instruction issued by application software or the like incorporated in the system.

The speed detection portion 115 detects speed information, such as a motion, vector per frame based on the time-series picture data Vs output from the child screen superposition portion 114. In this case, the speed detection portion 115 detects the speed information in increments of a pixel or of a predetermined area. The control portion 101 controls the speed detection portion 115 to detect zero-speed information on the child screen area. That is, the speed detection portion 115 is controlled substantially not to detect the speed in the child screen area.

In order to detect zero-speed information on the child screen area, for example, the speed detection portion 115 may take one of following measures: (1) the speed detection portion 115 may assume the speed information set value to be zero for the child screen area and perform no calculation for speed detection; or (2) the speed detection portion 115 may calculate the speed information on the child screen area but overwrite the calculated speed information on the child screen area with zero upon sending the speed information to the interpolation processing portion 117.

When child screen display is started, the control portion 101 sends a speed detection stop command to the speed detection portion 115, thereby stopping speed detection in the child screen area. The format of this command may involve sending the coordinate information regarding the child screen area (start point, end point, width, height, etc.) and, if the child screen area is predetermined, transmitting only a speed detection cancellation. As another format of the command, if there exist a plurality of predetermined child screen areas, these areas may be numbered so that only these area numbers may be transmitted. When child screen display is stopped, the control portion 101 sends a speed detection restart command to the speed detection portion 115, thereby restarting speed detection over the entire area.

Figure 2:
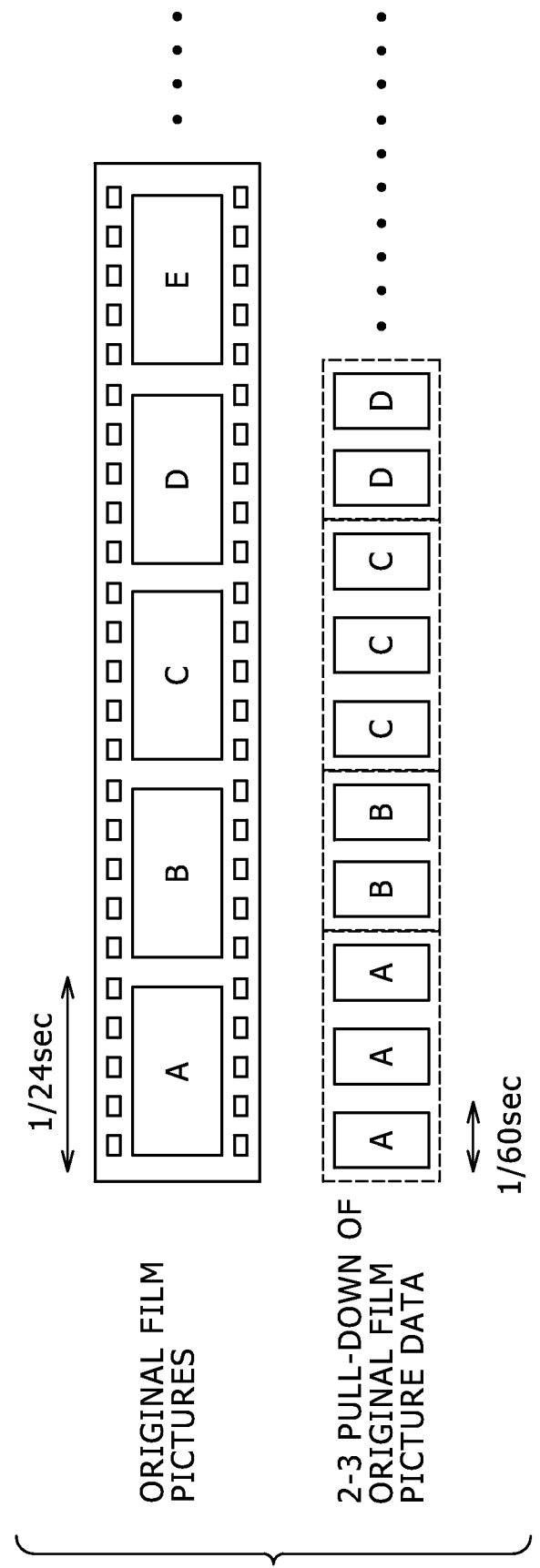
FIG. 2 is a schematic view showing correspondence relation between original film pictures and film picture data generated by a 2-3 pull-down method.

Based on the time-series picture data Vs output from the child screen superposition portion 114, the film picture determination portion 116 determines whether the time-series picture data Vs is film picture data generated from original film pictures. FIG. 2 shows correspondence relation between original film pictures and film picture data generated by a well-known 2-3 pull-down method. The 2-3 pull-down method involves converting (i.e., pulling down) 24-frame-per-second original film pictures to 30-frame-per-second (60-field) picture data. In this case, each odd-numbered frame is converted to two fields and each even-numbered frame to three fields, or vice versa.

The film picture determination portion 116 detects the above-mentioned regularity of film picture data and, based on the information thus detected, determines whether the time-series picture data Vs is film picture data. The control portion 101 controls the film picture determination portion 116 not to reference the detected information regarding the regularity of the child screen area upon performing the determination.

When child screen display is started, the control portion 101 sends to the film picture determination portion 116 a command to stop using the detected regularity information, thereby not referencing the detected regularity information of the child screen area upon determining whether the time-series picture data Vs is film picture data. The format of this command is substantially the same as that of the above-mentioned speed detection stop command sent to the speed detection portion 115 and thus will not be described further. Also, when child screen display is stopped, the control portion 101 sends to the film picture determination portion 116 a command to restart the use of the detected regularity information, thereby restarting the use of the detected regularity information over the entire area.

Based on the time-series picture data Vs output from the child screen superposition portion 114, the interpolation processing portion 117 generates interpolated picture data at given points in time in the course of the time-series picture data Vs and outputs time-series picture data Vout including the interpolated picture data. The interpolation processing portion 117 generates the interpolated picture data using the result of the determination performed by the film picture determination portion 116 along with the speed information detected by the speed detection portion 115.

Figure 3:
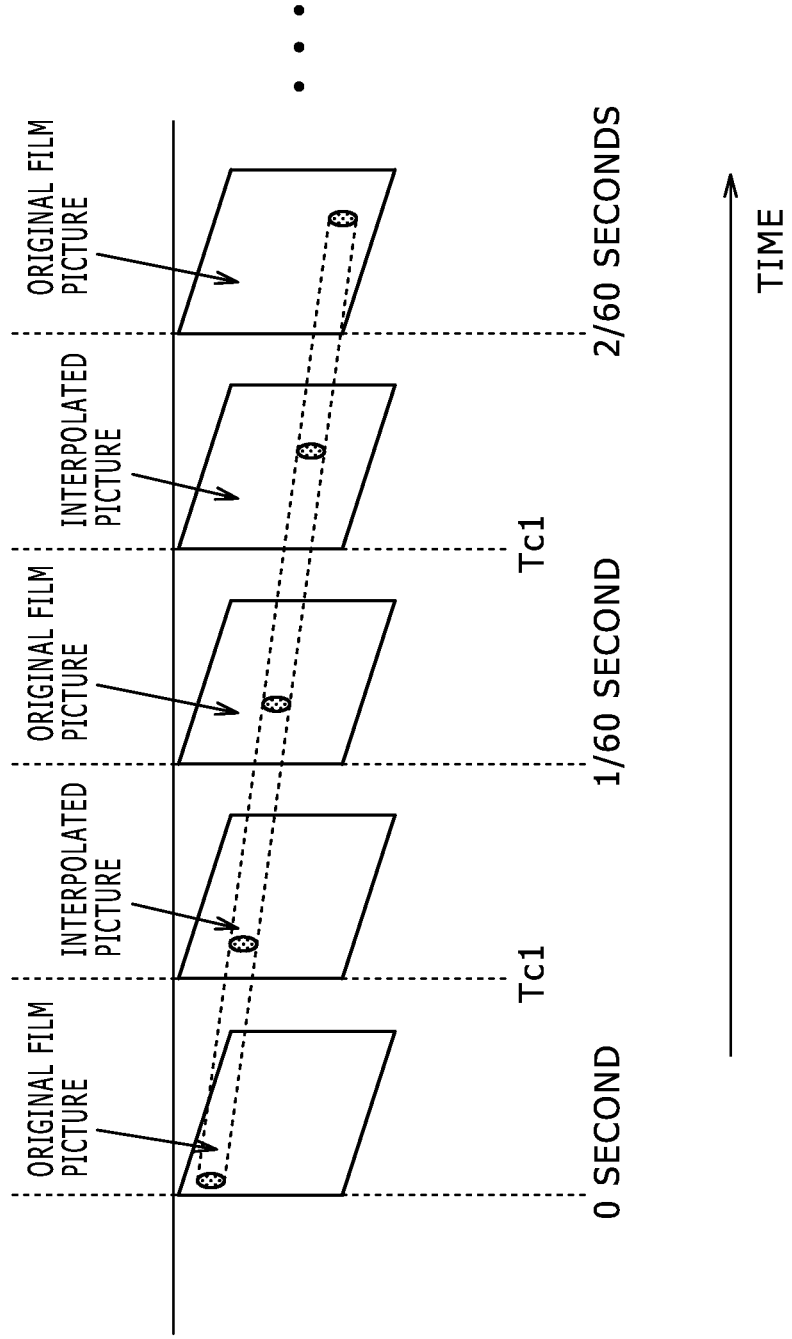
FIG. 3 is a schematic view explanatory of a "camera picture interpolation" process performed by an interpolation processing portion.

If the film picture determination portion 116 determines that the time-series picture data Vs is not film picture data, then the interpolation processing portion 117 performs a so-called "camera picture interpolation" process. FIG. 3 shows an example of the "camera picture interpolation" process. In this example, one interpolated picture is generated from and between two adjacent original pictures with the frame rate converted from 60 Hz to 120 Hz. In FIG. 3, reference symbols Tc1 and Tc2 indicate the timings of interpolated picture generation.

Figure 4:
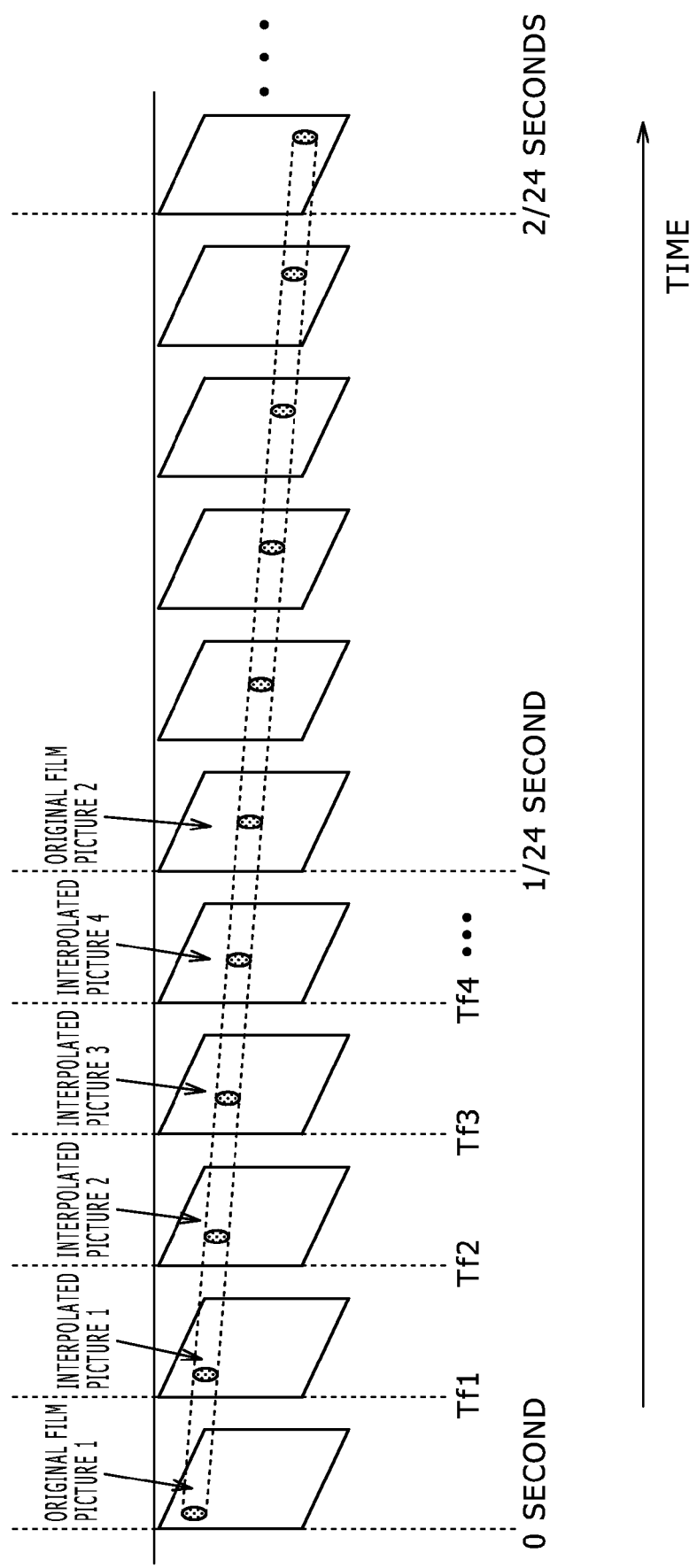
FIG. 4 is a schematic view explanatory of a "film picture interpolation" process performed by the interpolation processing portion.

If the film picture determination portion 116 determines that the time-series picture data Vs is film picture data, then the interpolation processing portion 117 performs a so-called "film picture interpolation" process. FIG. 4 shows an example of the "film picture interpolation" process. The "film picture interpolation" process is a process of interpolation that takes the regularity of film picture data into consideration. Unlike in the "camera picture interpolation" process, no interpolated picture is generated from two adjacent original pictures.

That is, the "film picture interpolation" process involves generating a predetermined number of interpolated pictures from between two original pictures 1 and 2 corresponding to adjacent frames of the original film pictures, as illustrated. The process converts the frame rate from 60 Hz to a desired rate. In FIG. 4, reference symbols Tf1, Tf2, Tf3, Tf4, . . . indicate the timings of interpolated picture generation.

The control portion 101 controls the interpolation processing portion 117 to stop the interpolation process on the child screen area. In this case, the interpolation processing portion 117 generates the interpolated picture data by utilizing the unmodified picture data on the child screen area in the time-series picture data Vs coming from the child screen superposition portion 114 for use as the picture data on the child screen area.

When child screen display is started, the control portion 101 sends an interpolation function stop command to the interpolation processing portion 117, thereby stopping the interpolation process on the child screen area. The format of this command is substantially the same as that of the above-mentioned speed detection stop command sent to the speed detection portion 115 and thus will not be described further. Also, when child screen display is stopped, the control portion 101 sends an interpolation function restart command to the interpolation processing portion 117, thereby restarting the interpolation process on the entire area.

The display panel 200 displays pictures derived from the time-series picture data Vout output from the picture processing block 100 (i.e., from the interpolation processing portion 117). For example, the display panel 200 may be a liquid crystal display panel as mentioned above. A high frame rate process performed by the picture processing block 100 helps enhance the picture quality of display on the display panel 200.

[Method of Communication between the Control Portion and the Other Components]

Explained below is a typical method of communication between the control portion (microcomputer) 101 on one hand, and the child screen superposition portion 114 and frame rate conversion portion (made up of the speed detection portion 115, film picture determination portion 116 and interpolation processing portion 117) on the other hand, in the picture processing block 100.

Figure 5:
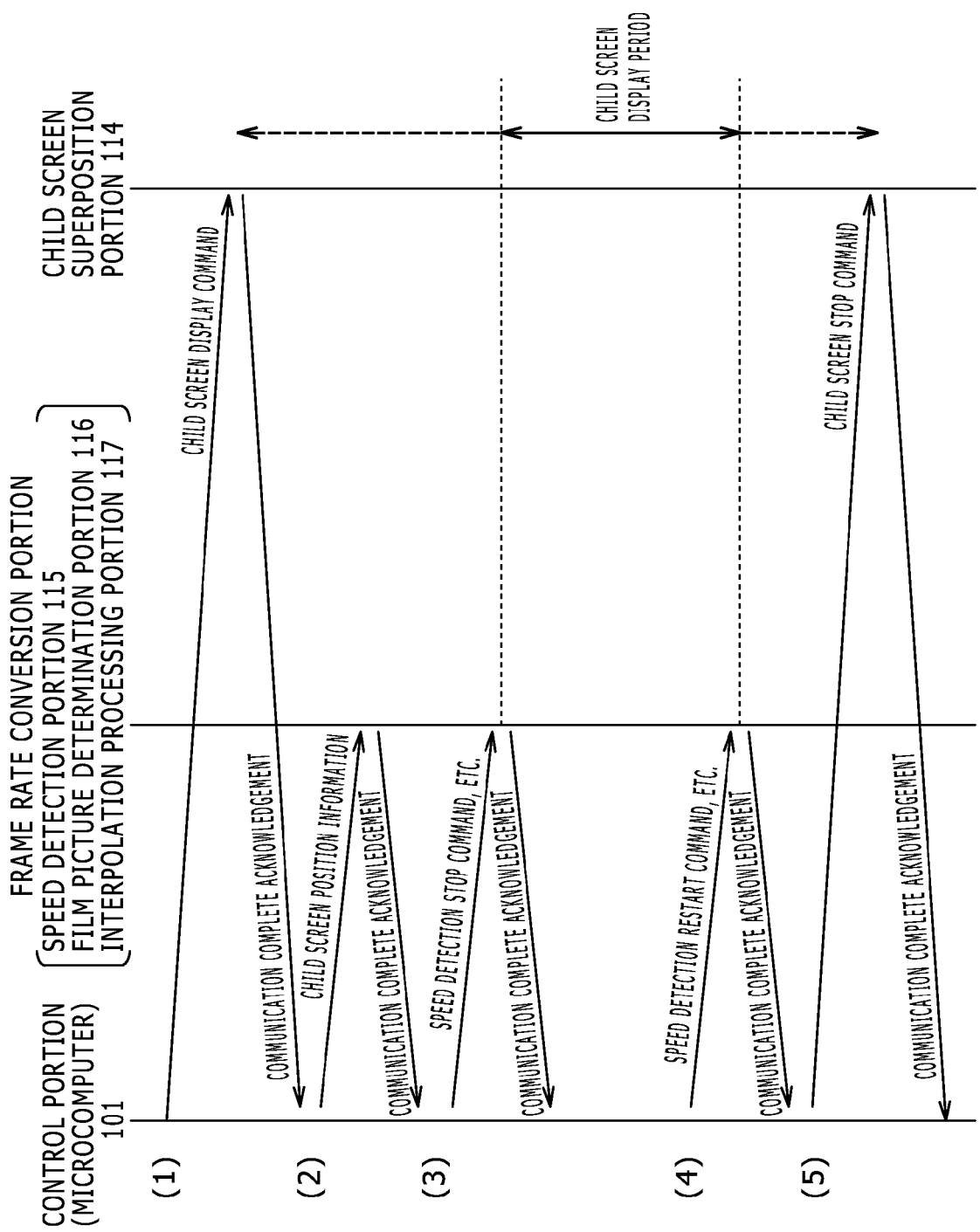
FIG. 5 is a schematic view explanatory of the method of communication among a control portion (microcomputer), a child screen superposition portion, and a frame rate conversion portion within a picture processing block.

FIG. 5 shows a specific example of communication methods. (1) Upon detecting a child screen display instruction given by the user or issued by application software or the like incorporated in the system, the control portion 101 sends a child screen display command to the child screen superposition portion 114. In response, the child screen superposition portion 114 returns a communication complete acknowledgement to the control portion 101.

(2) The control portion 101 then sends child screen position information for identifying the child screen area to the frame rate conversion portion (speed detection portion 115, film picture determination portion 116 and interpolation processing portion 117). As mentioned above, the transmission of the child screen position information may double as transmission of the speed detection stop command discussed later and the like. If the child screen position is predetermined, the transmission of the child screen position information may be omitted. In response, the frame rate conversion portion returns a communication complete acknowledgement to the control portion 101.

(3) Next, the control portion 101 sends a speed detection stop command, a detected regularity information use stop command, and an interpolation function stop command to the frame rate conversion portion. In response, the frame rate conversion portion returns a communication complete acknowledgement to the control portion 101. In this case, the moment the child screen is displayed, the control portion 101 transmits the speed detection stop command to the speed detection portion 115, thereby stopping speed detection in the child screen area. In this context, "the moment" refers to the point in time at which the time-series picture data Vs superimposed with the child screen reaches the speed detection portion 115. That point in time varies from one system configuration to another, so that each system needs to have suitable adjustments carried out for synchronization.

If the above synchronization with "the moment" is difficult to achieve in view of the system configuration, the control portion 101 may transmit the speed detection stop command to the speed detection portion 115 after the time-series picture data Vs superimposed with the child screen has reached the speed detection portion 115 (see an upward-pointing arrowed broken line in the upper part of FIG. 5.) This makes it possible not to stop speed detection in the child screen area with no child screen superposed on the picture data, thereby minimizing a feel of awkwardness on the screen. In this case, the control portion 101 may proceed to the next step after verifying that the "child screen display command" has been completed unfailingly, thereby providing more reliable control.

(4) Then if the control portion 101 detects a child screen display stop instruction given by the user or issued by application software or the like incorporated in the system, the control portion 101 transmits a command to the frame rate conversion portion. This command may include a speed detection restart command, a detected regularity information use restart command and an interpolation function restart command. In response, the frame rate conversion portion returns a communication complete acknowledgement to the control portion 101.

In this case, the moment child screen display is stopped, the control portion 101 transmits the speed detection restart command to the speed detection portion 115, thereby restarting speed detection over the entire area. In this context, "the moment" refers to the point in time at which the time-series picture data Vs not superimposed with any child screen reaches the speed detection portion 115. That point in time varies from one system configuration to another, so that each system needs to have suitable adjustments carried out for synchronization.

If the above synchronization with "the moment" is difficult to achieve in view of the system configuration, the control portion 101 may transmit the speed detection restart command to the speed detection portion 115 before the time-series picture data Vs not superimposed with any child screen reaches the speed detection portion 115 (see a downward-pointing arrowed broken line in the lower part of FIG. 5.) This makes it possible not to stop speed detection in the child screen area with no child screen superposed on the picture data, thereby minimizing a feel of awkwardness on the screen. In this case, the control portion 101 may proceed to the next step after verifying that the "speed detection restart command" has been completed unfailingly, thereby providing more reliable control.

(5) Next, the control portion 101 sends a child screen stop command to the child screen superposition portion 114. In response, the child screen superposition portion 114 returns a communication complete acknowledgement to the control portion 101.

[Operation of the TV Set]

What follows is a brief explanation of how the TV set 10 shown in FIG. 1 operates. The tuner 111 acquires the picture data (time-series picture data) of a desired TV program based on the user's tuning operations. The selected picture data is input to the input switching portion 113. As another example, the picture data (time-series picture data) input to the external input terminal group 112 from a BD recorder, a DVD player, a set-top box, a personal computer or the like may be forwarded to the input switching portion 113.

From the picture data acquired by the tuner 111 or from the picture data input to the external input terminal group 112, the input switching portion 113 selectively extracts the parent-screen picture data Vp and child-screen picture data Vc based on the user's operations. In this case, as many sets of the child-screen picture data Vc as the number of the child screens to be displayed are extracted. The parent-screen picture data Vp and child-screen picture data Vc thus extracted by the input switching portion 113 are supplied to the child screen superposition portion 114.

The child screen superposition portion 114 performs a child screen superposition process based on the child screen display instruction given by the user or issued by application software or the like incorporated in the system. Specifically, the parent-screen picture data Vp is combined with the child-screen picture data Vc to generate picture data that provides picture-in-picture or picture-and-picture display. In this case, the time-series picture data Vs output from the child screen superposition portion 114 is superimposed with the child screen.

Also, the child screen superposition portion 114 stops the child screen superposition process based on the child screen stop instruction given by the user or issued by application software or the like incorporated in the system. In this case, the time-series picture data Vs output from the child screen superposition portion 114 is not superimposed with any child screen.

The time-series picture data Vs output from the child screen superposition portion 114 is supplied to the interpolation processing portion 117, the speed detection portion 115 and the film picture determination portion 116. Based on the time-series picture data Vs output from the child screen superposition portion 114, the speed detection portion 115 detects speed information, such as a motion vector, per frame. If the time-series picture data Vs is superimposed with the child screen, speed detection is substantially stopped in the child screen area under control of the control portion 101.

Based on the time-series picture data Vs output from the child screen superposition portion 114, the film picture determination portion 116 determines whether the time-series picture data Vs is film picture data generated from original film pictures. In this case, the film picture determination portion 116 detects the regularity of the film picture data and performs the determination by referencing the information thus detected. If the time-series picture data Vs is superimposed with the child screen, then film picture determination portion 116 under control of the control portion 101 does not reference the detected information on the regularity of the child screen area upon performing the determination.

Based on the time-series picture data Vs output from the child screen superposition portion 114, the interpolation processing portion 117 generates interpolated picture data at given points in time in the course of the time-series picture data Vs, and outputs time-series picture data Vout including the interpolated picture data with the frame rate converted. The interpolation processing portion 117 is supplied with the result of the determination performed by the film picture determination portion 116 along with the above-mentioned speed information detected by the speed detection portion 115. The interpolation processing portion 117 generates the interpolated picture data by using the speed information and the result of the determination.

If the film picture determination portion 116 determines that the time-series picture data Vs is not film picture data, the interpolation processing portion 117 generates the interpolated picture data by carrying out the so-called "camera picture interpolation" process. On the other hand, if the film picture determination portion 116 determines that the time-series picture data Vs is film picture data, the interpolation processing portion 117 generates the interpolated picture data by carrying out the so-called "film picture interpolation" process.

If the time-series picture data Vs is superimposed with the child screen, the interpolation processing portion 117 stops the interpolation process on the child screen area under control of the control portion 101. That is, the interpolation processing portion 117 generates the interpolated picture data by utilizing the unmodified picture data on the child screen area in the time-series picture data Vs coming from the child screen superposition portion 114 for use as the picture data on the child screen area.

In the TV set 10 shown in FIG. 1, if the time-series picture data Vs output from the child screen superposition portion 114 is superimposed with the child screen, the speed detection portion 115 substantially stops speed detection on the child screen area under control of the control portion 101. This allows the interpolation processing portion 117 to generate the interpolated picture data on the parent screen without being affected by picture movements in the child screen area. Thus if there are quick picture movements on the child screen whereas the parent screen shows a still picture for example, the parent screen displaying the still picture is protected against the appearance of motions triggered by the movements on the child screen. This helps enhance the picture quality of display on the parent screen.

Also in the TV set 10 shown in FIG. 1, if the time-series picture data Vs output from the child screen superposition portion 114 is superimposed with the child screen, the film picture determination portion 116 under control of the control portion 101 does not reference the detected information of the regularity of the child screen area upon performing the determination. This allows the film picture determination portion 116 to properly determine whether the time-series picture data (parent screen) is film picture data without being affected by picture movements in the child screen area. Thus if the time-series picture data (parent screen) is film picture data, the interpolation processing portion 117 can reliably perform the process of generating the interpolated picture data corresponding to the film picture data (film picture interpolation.) This helps enhance the picture quality of display on the parent screen.

Also in the TV set 10 shown in FIG. 1, if the time-series picture data Vs output from the child screen superposition portion 114 is superimposed with the child screen, the interpolation processing portion 117 under control of the control portion 101 stops the interpolation process on the child screen area. That is, the interpolation processing portion 117 generates the interpolated picture data by utilizing the unmodified picture data on the child screen area in the time-series picture data Vs coming from the child screen superposition portion 114 for use as the picture data on the child screen area. This makes it possible more reliably to prevent the display on the child screen from getting disrupted due to the above-mentioned stopping of speed detection in the child screen area.

2. Modification Examples

Figure 6:
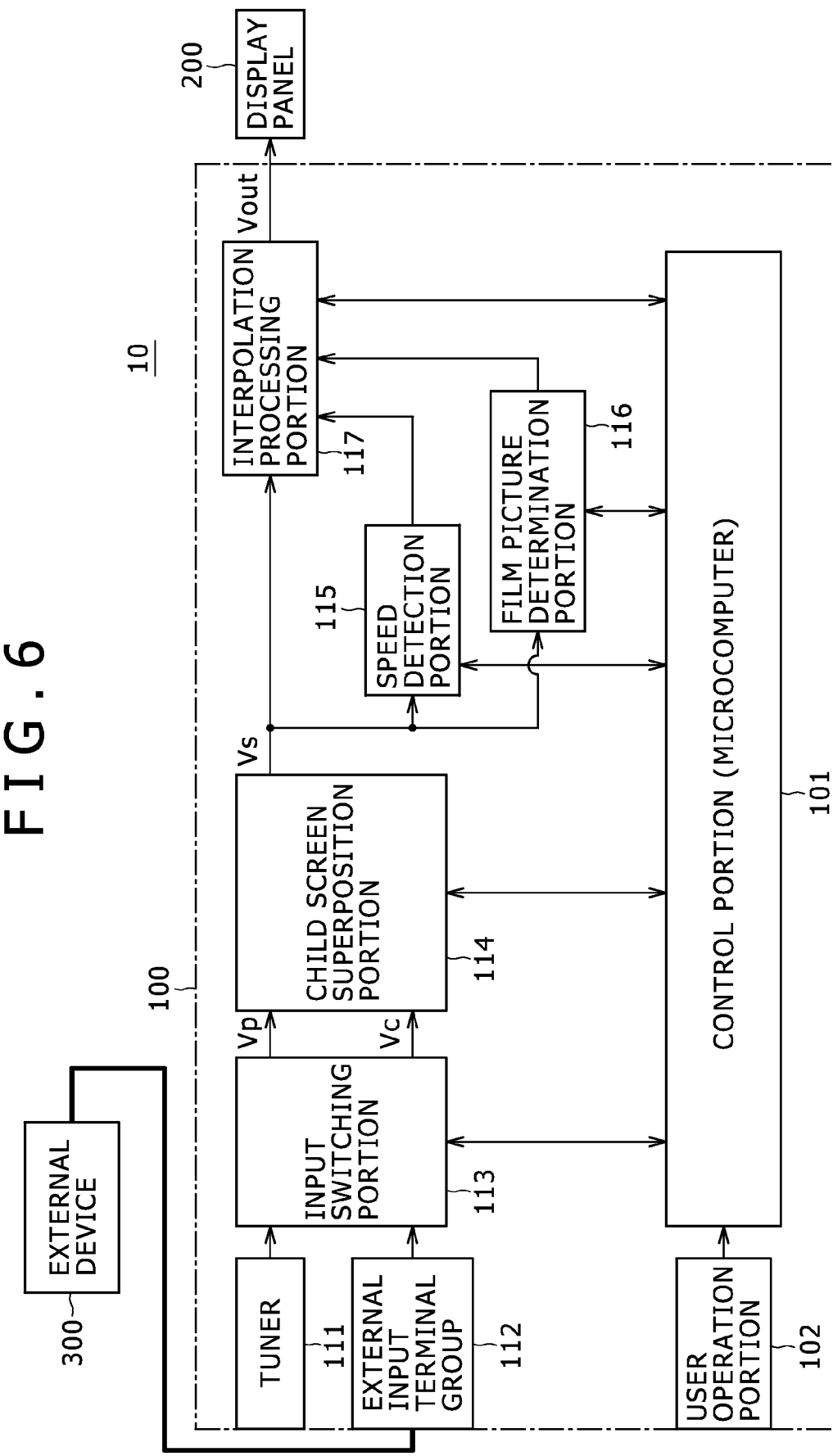
FIG. 6 is a schematic view explanatory of a setup in which time-series picture data from an external device connected to an external input terminal group is used unmodified, with the picture data already having a child screen superposed thereon.

In the above-explained embodiment of the present disclosure, examples were shown in which the child screen superposition portion 114 of the picture processing block 100 superposes the child screen. However, in an alternative case shown in FIG. 6 in which the time-series picture data from an external device 300 connected to the external input terminal group 112 is used unmodified as the picture data for display, the picture data may already have been superimposed with the child screen. In such a case, the control portion 101 may control the frame rate conversion portion (speed detection portion 115, film picture determination portion 116 and interpolation processing portion 117) to stop speed detection in the child screen area or to perform other suitable operations, thereby providing the same effects as the above-described embodiment.

In the case above, the control portion 101 communicates with the external device 300 to acquire multi-screen information (i.e., whether the child screen is superimposed or not), child screen position information and other information therefrom. Such communication may be accomplished by use of the HDMI-CEC (High-Definition Multimedia Interface—Consumer Electronics Control) capability or AV.Link (Audio Visual Link) through a SCART (Syndicat des Constructeurs d'Appareils Radiorécepteurs et Téléviseurs) input, for example.

Conceivably, the control portion 101 may not be able to communicate with the external device 300 or can communicate therewith but is not capable of acquiring multi-screen information therefrom. In such cases, the control portion 101 can control the frame rate conversion portion (speed detection portion 115, film picture determination portion 116 and interpolation processing portion 117) not to perform frame rate conversion through the generation of interpolated picture data. Since it is not clear in these cases whether the time-series picture data from the external device 300 involves multi-screen display mode, exercising control to suppress frame rate conversion makes it possible to avoid inconveniences such as generating the interpolated picture data in which the picture movements in the child screen affect the parent screen.

Where the time-series picture data from the external device 300 connected to the external input terminal group 112 is already superimposed with the child screen, the user may give instructions to the control portion (microcomputer) 101 through the user operation portion 102. Given the instructions, the control portion 101 controls the frame rate conversion portion (speed detection portion 115, film picture determination portion 116 and interpolation processing portion 117) to handle the child screen area in the manner described above. In this case, the user may be allowed to specify the child screen area on the display screen of the display panel 200. Also in this case, the position information of the child screen area may be preset if the child screen is to appear in the same position each time.

In the above-explained embodiment, the control portion (microcomputer) 101 receives the child screen display on/off instruction from the user or from application software incorporated in the system or the like. Based on the instruction thus received, the control portion (microcomputer) 101 controls the frame rate conversion portion (speed detection portion 115, film picture determination portion 116 and interpolation processing portion 117).

Figure 7:
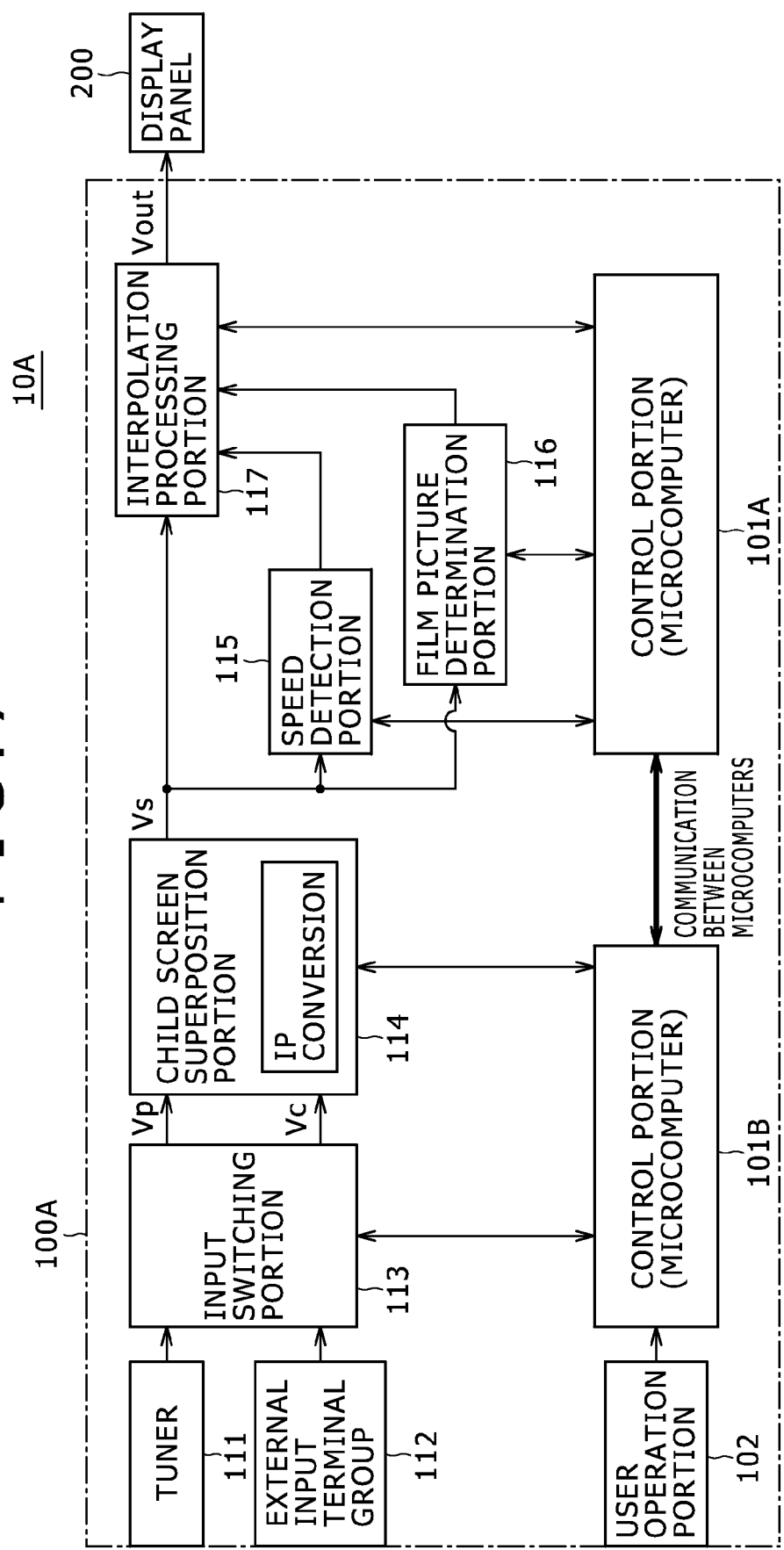
FIG. 7 is a block diagram showing another typical structure of the TV set.

However, in an alternative structure, a control portion (microcomputer) for receiving the child screen display on/off instruction may exist separately from a control portion (microcomputer) for controlling the frame rate conversion portion (speed detection portion 115, film picture determination portion 116 and interpolation processing portion 117). FIG. 7 shows a typical structure of such an alternative TV set 10A. In FIG. 7, the components with their corresponding counterparts found in FIG. 1 are designated by the same reference symbols and their explanations are omitted.

In FIG. 7, the picture processing block 100A has control portions (microcomputers) 101A and 101B. The control portion 101A controls the frame rate conversion portion (speed detection portion 115, film picture determination portion 116, and interpolation processing portion 117). The control portion 101B controls the input switching portion 113 and the child screen superposition portion 114.

The user operation portion 102 is connected to the control portion 101B. The control portion 101B receives the child screen display on/off instruction from the user or from application software incorporated in the system or the like. In that sense, the control portion 101B constitutes a display on/off instruction reception portion.

The control portion 101B can transmit child screen display on/off information to the control portion 101A through I2C (Inter-Integrated Circuit) or UART (Universal Asynchronous Receiver Transmitter) communication. In this structure, however, the control portion 101B transmits the child screen display on/off information to the control portion 101A through port control in order to ensure the quickest possible response of child screen display getting turned on or off. For example, upon receipt of a child screen display-off instruction, the control portion 101B needs to send the information to the control portion 101A before child screen display is turned off.

FIGS. 8A and 8B show a typical method of port communication carried out by the above structure. FIG. 8A shows whether the child screen is superimposed or not. FIG. 8B illustrates child screen trigger pulses output to an inter-microcomputer communication port. In the figures, reference symbol Tp denotes a polling cycle of the control portion (microcomputer) 101A, which is set to 20 ms here for example. Reference symbol Tt denotes the width of the child screen trigger pulse which is set to 30 ms here for example, wide enough for the control portion (microcomputer) 101A to reliably capture a "High" edge during the polling process.

In the case above, there need only be a time period Ta long enough for the control portion (microcomputer) 101A to recognize a child screen trigger pulse and complete the transmission of control parameters to the frame rate conversion portion (speed detection portion 115, film picture determination portion 116 and interpolation processing portion 117).

As explained above, the control portion 101B transmits the child screen display on/off information to the control portion 101A through port control. This makes it possible to quickly transmit the display-on/off information of the child screen of interest.

Although not discussed above, the frame rate conversion portion (speed detection portion 115, film picture determination portion 116 and interpolation processing portion 117) in the picture processing block 100 or 100A may also be implemented by hardware. As another alternative, the frame rate conversion portion may be implemented by using software (programs) for causing a computer to function as the functional blocks involved.

The above-described present disclosure may be applied to picture display apparatuses, such as TV sets, that enhance the quality of moving pictures by using frame interpolation through speed detection.

It should be understood by those skilled in the art that various modifications, combinations, sub-combinations and alterations may occur depending on design requirements and other factors insofar as they are within the scope of the appended claims or the equivalents thereof.

What is claimed is:

1. A picture processing apparatus comprising:
an interpolated picture data generation portion configured so as to, based on time-series picture data, generate interpolated picture data at given points in time in the course of the time-series picture data; and
a control portion configured so as to control the interpolated picture data generation portion by using multi-screen information of the time-series picture data, wherein
the interpolated picture data generation portion includes
a speed detection portion configured so as to detect speed information per frame based on the time-series picture data; and
an interpolation processing portion configured so as to generate the interpolated picture data by using the speed information detected by the speed detection portion based on the time-series picture data; and
wherein the control portion controls the speed detection portion substantially not to detect the speed in a child screen area, wherein the interpolated picture data generation portion further includes
a film picture determination portion configured so as to, based on the time-series picture data, detect the regularity of the time-series picture data in order to determine, using the information thus detected, whether the time-series picture data is film picture data generated from original film pictures, based on the time-series picture data, the interpolation processing portion generates the interpolated picture data using the result of the determination performed by the film picture determination portion along with the speed information detected by the speed detection portion; and wherein
the control portion controls the speed detection portion substantially not to detect the speed in the child screen area while controlling the film picture determination portion not to reference the detected information regarding the regularity of the child screen area upon performing the determination.

2. The picture processing apparatus according to claim 1, wherein the control portion controls the interpolated picture data generation portion, wherein the interpolated picture data for the child screen area is not generated.

3. The picture processing apparatus according to claim 1, further comprising:
a display on/off instruction reception portion configured so as to receive a child screen display on/off instruction,
wherein the display on/off instruction reception portion transmits the received child screen display on/off instruction to the control portion through port control.

4. The picture processing apparatus according to claim 1, further comprising:
a picture data input portion configured so as to receive the time-series picture data from an external device; and
a multi-screen information acquisition portion configured so as to acquire the multi-screen information of the received time-series picture data.

5. The picture processing apparatus according to claim 4, wherein the multi-screen information acquisition portion acquires the multi-screen information from the external device through communication with the external device.

6. The picture processing apparatus according to claim 4, wherein, if the multi-screen information acquisition portion does not acquire the multi-screen information of the received time-series picture data from the external device, then the control portion controls the interpolated picture data generation portion not to generate the interpolated picture data.

7. A picture processing method comprising:
generating interpolated picture data at given points in time in the course of time-series picture data, wherein the generation of the interpolated picture data is based on the time series picture data;
controlling the generation of the interpolated picture data for the time series picture data based on multi-screen information of the time-series picture data, wherein the multi-screen information indicates the presence or absence of at least one child screen over a parent screen displaying the time-series picture data;
detecting the regularity of the time-series picture data in order to determine whether the time-series picture data is film picture data generated from original film pictures; and
generating the interpolated picture data using a result of the determination.

8. The picture processing method according to claim 7, further comprising generating the interpolated picture data for the parent screen excluding the child screen.

9. A non-transitory computer-readable storage medium having stored thereon, a computer program having at least one code section for picture processing, the at least one code section being executable by a device for causing the device to perform steps comprising:

in a picture processing apparatus:

generating interpolated picture data at given points in time in the course of time-series picture data, wherein the generation of the interpolated picture data is based on the time series picture data;

controlling the generation of the interpolated picture data based on multi-screen information of the time-series picture data, wherein the multi-screen information indicates the presence or absence of at least one child screen over a parent screen displaying the time-series picture data; and detecting the regularity of the time-series picture data in order to determine whether the time-series picture data is film picture data generated from original film pictures, wherein the interpolated picture data is generated using a result of the determination.

10. The non-transitory computer-readable storage medium according to claim 9, wherein the interpolated picture data for the parent screen excluding the child screen is generated.

11. A picture display apparatus comprising:

an interpolated picture data generation portion operable to generate interpolated picture data at given points in time in the course of time-series picture data, wherein the generation of the interpolated picture data is based on the time series picture data;

a control portion operable to control the interpolated picture data generation portion generating the interpolated picture data based on multi-screen information of the time-series picture data, wherein the multi-screen information indicates the presence or absence of at least one child screen over a parent screen displaying the time-series picture data;

a picture display portion operable to display pictures derived from the time-series picture data including the interpolated picture data generated by the interpolated picture data generation portion;

a film picture determination portion operable to detect the regularity of the time-series picture data in order to determine whether the time-series picture data is film picture data generated from original film pictures; and an interpolation processing portion operable to generate the interpolated picture data using a result of the determination performed by the film picture determination portion.

12. The picture display apparatus according to claim 11, wherein interpolated picture data generation portion is operable to generate the interpolated picture data for the parent screen excluding the child screen.

* * * * *